Patented Sept. 13, 1932

1,877,641

UNITED STATES PATENT OFFICE

PAUL H. BOLTON AND ERIC N. BOLTON, OF YOUNGSTOWN, OHIO

PROCESS FOR FOOD PRODUCTS

No Drawing.   Application filed August 24, 1929. Serial No. 388,258.

This invention relates to a food product and the process of making the same, the object being to provide an improved food product made up of cereals, nuts, fruits and other similar foods coated with certain ingredients to improve the taste and at the same time preserve the food article.

Another object of the invention is to provide an improved process of treating cereals, nuts, fruits and similar foods, so that they will be coated with honey, lactose and other coatings, if desired, to produce a commercial food product which will not readily deteriorate and which is more palatable than in the natural state.

In carrying out the method and in producing the article of food embodying the invention, any suitable apparatus may be used, as for instance, an ordinary steam jacketed copper panning machine used extensively in the confectionary industry. This machine is provided with a kettle which is adapted to be rotated and into which the ingredients are placed. Associated with this well-known machine is a spray apparatus which may be of any well-known or preferred structure, and which will spray honey or other material into the kettle of the panning machine so as to coat the ingredients placed therein.

Specifically in carrying out the invention, a quantity of any of the present-day breakfast foods, cereals, nuts, fruits or other food products, may be placed in the kettle. The kettle is then warmed by the usual steam jacket and rotated, so that the ingredients placed therein will be warmed and stirred. While this is being done a quantity of strained honey or extracted honey is heated until it flows easily and is then placed in a sprayer. After the cereal or other food articles have been placed in the kettle and stirred for a short time the sprayer is opened or turned on and this sprayer produces a mist of honey which is directed to the article of food in the kettle, so that in a very short time the different, individual pieces of the articles of food are coated. This may take from one-half of one minute to five or ten minutes according to the amount of food being treated at one time. The intention is to apply a very thin coating of honey, and then the sprayer is turned off. As soon as the sprayer has been turned off the next step is to dust the food being treated with lactose (impalpable milk sugar) in powder form until a thin coat has been applied. The material in the panning machine is stirred and heated during the application of the lactose and the heating and stirring continues after the lactose has been applied. This continued stirring and heating is maintained until the moisture is driven off and the coated food is no longer sticky. When the food product has been deprived of its moisture a second coat of honey is sprayed onto the food and then a coat of lactose applied, as just described. This process is continued alternately until the desired amount of honey is incorporated with the product. Two coatings of honey and one of lactose or two of lactose may be sufficient for some articles of food, but in most instances several coatings are applied. The lactose acts as means for preventing the honey from deliquescing and also presents a coating of appreciable food value. Where the cereal is bran the coating converts an almost unpalatable article into an article of food which is not only healthful, but is pleasant to the taste. The process is adapted to be applied to cereals of any kind, nuts, fruits and other natural food products, in order to preserve the same and also make the same more palatable, as well as more healthful. In some circumstances flavoring matter is added to the honey, and if desired, coloring matter may also be added.

What we claim is:—

1. A food product, comprising a food article of the class consisting of nuts, fruits and cereals, a coating of honey in contact with said food article, a coating of impalpable milk sugar (lactose) covering said coating of honey, and an outside coating of honey covering said coating of sugar.

2. A process of producing a food product, consisting in stirring a plurality of articles of food, providing a mixture of honey during the stirring operation so that the different articles will be coated with the honey, spraying a powdered lactose on said articles during the stirring operation after they have been coated with honey, and then spraying a second coating of honey on said articles, and finally driving off the moisture by heating said coated articles.

3. The process of producing a food product, consisting in stirring a quantity of cereal or other food articles, heating said cereal or other food article during the stirring operation between a temperature of 125° and 200° F., alternately supplying coatings of honey and lactose to said articles while they are heated and while they are being stirred, and continually stirring and heating after said coatings have been applied until substantially all of the moisture in said coatings has been driven off.

4. The method of producing a food product consisting of subjecting a supply of food of the class consisting of nuts, fruits, to heat, stirring the food while the same is subjected to heat, spraying honey on the food during the stirring action in a manner to produce a mist so that the individual particles of food may be coated, and applying a coating of lactose over the coating of honey, and continuing the stirring action during the application of the lactose, and finally subjecting the coated food to heat and the stirring action until the moisture has been driven off.

PAUL H. BOLTON.
ERIC N. BOLTON.